US009512046B2

(12) United States Patent
Beckingham et al.

(10) Patent No.: US 9,512,046 B2
(45) Date of Patent: *Dec. 6, 2016

(54) PHOSPHATIC CLAY PRODUCTS FOR USE AS SOIL WETTING AGENTS, AND METHODS OF DELIVERY OF PHOSPHATIC CLAYS TO SOIL

(71) Applicant: The Mosaic Company, Plymouth, MI (US)

(72) Inventors: Neil Beckingham, Tampa, FL (US); Tom Pospichal, Valrico, FL (US); Bryan Baylor, Lithia, FL (US)

(73) Assignee: The Mosaic Company, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,131

(22) Filed: Aug. 29, 2014

(65) Prior Publication Data

US 2014/0366599 A1 Dec. 18, 2014

Related U.S. Application Data

(63) Continuation-in-part of application No. 13/804,891, filed on Mar. 14, 2013, now Pat. No. 9,067,843.

(60) Provisional application No. 61/683,988, filed on Aug. 16, 2012.

(51) Int. Cl.
| | |
|---|---|
| *C05G 3/06* | (2006.01) |
| *C05B 17/00* | (2006.01) |
| *B01J 20/12* | (2006.01) |
| *B01J 20/26* | (2006.01) |
| *B01J 20/28* | (2006.01) |
| *B01J 20/30* | (2006.01) |
| *C05D 9/00* | (2006.01) |
| *C05G 3/00* | (2006.01) |
| *A01C 1/06* | (2006.01) |

(52) U.S. Cl.
CPC ............... *C05G 3/06* (2013.01); *B01J 20/12* (2013.01); *B01J 20/26* (2013.01); *B01J 20/28004* (2013.01); *B01J 20/28016* (2013.01); *B01J 20/3028* (2013.01); *C05B 17/00* (2013.01); *C05D 9/00* (2013.01); *C05G 3/0041* (2013.01); *A01C 1/06* (2013.01); *Y10T 428/2982* (2015.01)

(58) Field of Classification Search
None
See application file for complete search history.

(56) References Cited

U.S. PATENT DOCUMENTS

| | | |
|---|---|---|
| 2,579,732 A | 12/1951 | Funsten et al. |
| 3,761,239 A | 9/1973 | Cook et al. |
| 4,066,432 A | 1/1978 | Jones |
| 4,402,756 A | 9/1983 | Prine |
| 4,810,280 A | 3/1989 | Le Van Mao et al. |
| 5,290,962 A | 3/1994 | Ozdoba et al. |
| 7,410,522 B2 | 8/2008 | Green |
| 9,067,843 B2 * | 6/2015 | Beckingham ........... E02D 3/005 |
| 2001/0029762 A1 * | 10/2001 | Steele et al. ................. 71/63 |
| 2003/0172699 A1 | 9/2003 | Phinney |
| 2004/0152596 A1 | 8/2004 | Peltonen et al. |
| 2006/0010949 A1 | 1/2006 | Palmer et al. |
| 2009/0113966 A1 | 5/2009 | Kweeder |
| 2010/0135733 A1 | 6/2010 | Olesen |
| 2011/0214465 A1 | 9/2011 | Peacock et al. |
| 2013/0125598 A1 | 5/2013 | Bradbury |
| 2014/0051570 A1 | 2/2014 | Beckingham et al. |
| 2014/0235438 A1 | 8/2014 | Thompson et al. |

FOREIGN PATENT DOCUMENTS

| | | |
|---|---|---|
| JP | H 01301576 A | 12/1989 |
| WO | WO 2009/039560 A1 | 4/2009 |

OTHER PUBLICATIONS

Application for U.S. App. No. 13/804,891, filed Mar. 14, 2013; inventors Beckingham et al.
Stricker, J. A. et al., "Energy from Crops: Production and Management of Biomass/Energy Crops on Phosphatic Clay in Central Florida,". Electronic Data Information Source (EDIS), Circular 1084, University of Florida, Gainesville, 1998, 8 pages.
Singh, S.P. et al. "Characterization of aqueous lead removal by phosphatic clay: Equilibrium and kinetic studies." Journal of Hazardous Materials, 2006, vol. 136, Issue 3, 9 pages.
Hanlon, Edward A., "Naturally Occurring Radionuclides in Agricultural Products." Electronic Data Information Source (EDIS), SL221, University of Florida, Gainesville, 2004, 5 pages.
PCT Search Report and Written Opinion dated Oct. 25, 2013 for PCT Application No. PCT/US2013/054697 filed Aug. 13, 2013, 14 pages.
Stricker, James A., "High Value Crop Potential of Reclaimed Phosphatic Clay Soil", 2000 Annual Meeting of the American Society for Surface Mining and Reclamation, Tampa, Florida, Jun. 11-15, 2000, pp. 1-12.

(Continued)

Primary Examiner — Wayne Langel
(74) Attorney, Agent, or Firm — Patterson Thuente Pedersen, P.A.

(57) ABSTRACT

Phosphatic clays, and the use of phosphatic clays as a soil wetting agent. Phosphatic clays as wetting agents aid in the retention of water in sandy soil, and/or for prevention or reduction of leaching of nutrients. Due to its unique mineralogy, rheology, particle size and shape, phosphatic clay exhibits high water absorbing and retaining qualities as compared to other clay varieties. Further, phosphatic clay is readily available as a by-product of mining of phosphatic ore. The phosphatic clay wetting agents increases the effectiveness of the water applied to the soil, thereby reducing the amount of run-off, and reducing the amount of water needed to accomplish sufficient irrigation. The phosphatic clay wetting agents can be delivered to the soil as a sprinkle-on product, granule product, spray-on product, soil amendment, fertilizer or seed coating, or fertilizer composition.

12 Claims, No Drawings

(56) References Cited

OTHER PUBLICATIONS

MicroEssentials website printout, http://www.microessentials.com/, 1 page, 2012.
KMag website printout, http://www.kmag.com/, 2012, 1 page.
Hanlon, E.A. et al., "Phosphatic Clay for Agricultural Uses: Bibliography", University of Florida IFAS Extension, Apr. 2005, 13 pages.
Hanlon, E.A. et al., "Landscape Diversity: Multiple-Use Landscapes for Reclaimed Phosphatic Clay Areas", University of Florida IFAS Extension, Sep. 2005, 5 pages.
Office Action dated Oct. 28, 205 for Australian Application No. 2013302773, 3 pages.
Search Report and Written Opinion dated Oct. 22, 2015 for PCT Application No. PCT/US2015/043374, 12 pages.

\* cited by examiner

PHOSPHATIC CLAY PRODUCTS FOR USE AS SOIL WETTING AGENTS, AND METHODS OF DELIVERY OF PHOSPHATIC CLAYS TO SOIL

RELATED APPLICATIONS

The present application is a continuation-in-part application of U.S. application Ser. No. 13/804,891 entitled PHOSPHATIC CLAY PRODUCTS FOR USE AS SOIL WETTING AGENTS, AND METHODS OF DELIVERY OF PHOSPHATIC CLAYS TO SOIL, AND PHOSPHATIC CLAY COATINGS FOR PURPOSE OF WATER RETENTION, filed Mar. 14, 2013, and claims the benefit of U.S. Provisional Application No. 61/683,988 entitled PHOSPHATIC CLAY PRODUCTS FOR USE AS SOIL WETTING AGENTS, AND METHODS OF DELIVERY OF PHOSPHATIC CLAYS TO SOIL and filed Aug. 16, 2012, each of which is incorporated herein in its entirety by reference.

FIELD OF THE INVENTION

The invention relates generally to phosphatic clays, and more particularly to the use of separated phosphatic clays as a soil wetting agent to aid in the retention of water in sandy soil, and/or for prevention or reduction of leaching of nutrients. The phosphatic clays can be delivered to the soil as a granular product, sprinkle-on product, spray-on product, soil amendment, fertilizer or seed coating, or fertilizer composition.

BACKGROUND OF THE INVENTION

Vegetation, such as lawns or horticultural crops, grown in areas where the soil structure prevents the ready absorption of moisture can result in excess irrigation water runoff due to water penetration becoming increasingly more difficult due to the sun's hardening of the soils surface and creating hydrophobic conditions in which the soil becomes unable to rapidly absorb water. As the soil becomes increasingly hydrophobic, the soil begins to repel much needed water from entering into the soil profile.

Vegetation, such as lawns or horticultural crops, grown in areas where the soil structure prevents or inhibits the retention of moisture can result in excess irrigation water requirements due to the water simply draining out of the soil profile too quickly, which results in need to constantly reapply moisture. This is typical of soils with high sand (quartz) content.

This can result in excessive use of water and potentially harmful run-off. The run-off can include plant nutrients, insecticides, fungicides, and herbicides, which can cause greater loss of crop productivity, and to the environment if such items are found in surface water reservoirs. Furthermore, this ineffective use of water can create higher demands on the water source used for irrigation.

During periods of drought, the lack of soil moisture results in plants undergoing moisture stress due to lack of soil moisture which will result in plant wilting, yield losses and ultimately death of the plant. At the same time this stress can increase the pathway for insect and disease infections and competition of more drought resistant weeds.

With respect to seed, seeds planted in soils that have characteristics outlined above, i.e. soils that are either hydrophobic or are unable to retain or have difficulty retaining moisture, can have their germination impeded, or they may require excessive watering to survive.

Soil wetting agents, or surfactants, are often introduced to the soil profile to help alleviate the issue of moisture absorption and/or retention of the soil, thereby increase the effectiveness of the water such that less is needed. Soil wetting agents work by lowering the cohesive and/or adhesive surface water tension and by absorbing and retaining water in the soil profile. This reduction of surface tension allows the water to spread out more evenly and allows for better penetration into the soils, and retention in the soil profile, including hydrophobic soils, or sandy soils, as well as more effective use of water.

Soil wetting agents can be polymer-based. These synthetic wetting agents are a relatively expensive product (compared to standard soil amendments), thereby possibly limiting their application, in addition polymers can over time degrade.

Naturally occurring clays have a natural affinity to water, and have a high water holding capacity. This is due to its extensive ability to bind water and to establish coherent structures in dry conditions. Clays, in addition to increasing water retention in soil, can provide plants with certain nutrients. Clays have been used as a wetting agent admixed with soils, such as described, for example, in U.S. Patent Application Publication No. 2010/0135733, and U.S. Pat. No. 4,810,280. However, prior art systems of admixing clays typically required large amounts of clay to be incorporated which is difficult and expensive to manufacture, require shipment of clay if the clay is not close at hand to the manufacturing site, or can cause dusting or attrition issues.

There remains a need for a readily-available source of clay variety, with a high water absorbing and retaining capacity, for use as a soil wetting agent with sufficient water holding capacity.

SUMMARY OF THE INVENTION

Embodiments of the present invention solve many of the drawbacks of the prior art wetting agents described above. According to embodiments of the invention, phosphatic clays are used as a wetting agent in soils, particularly hydrophobic or sandy soils. Due to its unique particle size and shape, phosphatic clay exhibits higher water absorbing and retaining qualities than other clays used as wetting agents. Compared to the synthetic wetting agents of the prior art, phosphatic clays have close to infinite capacity to retain and then release water over time and will only loose capacity through organic material dilution over time.

Further, beneficiated (pure) phosphatic clay is readily available as a by-product of mining of phosphatic ore. Phosphatic clay occurs in a matrix of sand, slay, and phosphare ore The phosphatic clay wetting agents increases the effectiveness of the water applied to the soil, thereby reducing the amount of run-off, and reducing the amount of water needed to accomplish sufficient irrigation.

In one embodiment, a phosphatic clay product comprises granules formed from a plurality of phosphatic clay particulates. The granules are formed by granulating phosphatic clay particulates optionally in the presence of a binder. The granules have a size of from about 0.1 to about 5 mm, and more particular, from about 1.0 mm to about 2.0 mm. Suitable binders can include, but are not limited to, calcium lignosulfonate, corn syrup, poly-vinyl alcohol (PVA) and PVA-based adhesives or glues, wheat starch, molasses, and combinations thereof. The binder can be present in an amount of about 0.1 wt % (dry weight of granule) to about 20 wt %.

In another embodiment, a phosphatic clay product comprises a spray-on emulsion of phosphatic clay in water for use as a wetting agent. The emulsion is topically sprayed onto a soil, such as metered through a hose attachable spray pack. Alternatively, a dry broadcast of phosphatic clay can be applied topically to a soil. In either application, the phosphatic clay product acts as a wetting agent by penetrating, at a low concentration, through the foliage, and entering the root zone of a plant, where it will remain and absorb water to sufficiently supply the foliage.

In an alternative embodiment of the invention, a phosphatic clay product comprises a fertilizer granule or seed having a coating including phosphatic clay particulates. This coating application allows the fertilizer or seed to attract and retain water molecules around the fertilizer granule or seed itself, thereby altering the micro soil environment, as opposed to the entire soil profile, to improve plant health, increase plant growth, and/or restrict leaching of nutrients away from the fertilizer granule or seed.

In a particular embodiment, the phosphatic clay particulates can be dispersed in a carrier, such as water, forming a slurry of particulates for application to fertilizer granules. Alternatively, the particulates are coated over the granule using a binder material, such as the binders described previously. The slurry or coating covers the granule and the grains or particulates fill in voids in the granules giving the granule a smoother outer surface. The coating can be applied for the purposes of controlling the release of nutrients from the base granule, to the soil, such that the fertilizer granule is a controlled- or slow-release fertilizer. In this respect, an optional coating, such as polymer coating (e.g. polyurethane) can be applied to the outer surface to further that assist or control the release of nutrients from the base fertilizer granule, to the soil. Because the outer surface is smoother than an uncoated granule due to the initial coating of phosphatic clay particulates, less polymer material is needed to evenly coat the granule.

In yet another embodiment of the invention, a phosphatic clay product comprises a soil amendment or blend comprising a soil, such as a top soil, admixed with phosphatic clay. This application acts as a wetting agent by penetrating, at a high concentration, through the soil profile, where it will remain and absorb water to sufficiently supply the vegetation planted within the soil, thereby altering the soil profile of a general area.

Phosphatic clays are a byproduct of the beneficiation process of mining phosphatic ore. More specifically, the mined phosphate occurs in a matrix of sand, clay, and phosphate ore, typically in equal proportions. The clay portion is washed from the matrix in the beneficiation process. The clays are typically managed as a waste product, and are pumped to large settling areas at about 3 to about 5% clay solids, typically at rates of 20,000 to 80,000 gpm, where clays are allowed to settle out of suspension, or consolidate, typically to 12 to 15% solids. These settling areas can range in size from about 300 to 800 acres.

Embodiments of the present invention, in addition to the advantages with respect to adverse growing conditions, can alleviate or reduce the need for large clay settling areas, and can make better use of the energy and water used in the separation of clay/sand and phosphate ore in the beneficiation process, thereby providing additional environmental benefits.

Phosphatic clays products according to embodiments of the invention can be used to enhance soils for any of a number of uses such as, for example, agricultural purposes, such as for growing crops or gardens, residential or commercial lawns, sporting fields or turfs such as golf courses, sports fields, sods, or any of a variety of non-limiting uses.

The above summary of the various representative embodiments of the invention is not intended to describe each illustrated embodiment or every implementation of the invention. Rather, the embodiments are chosen and described so that others skilled in the art can appreciate and understand the principles and practices of the invention.

DETAILED DESCRIPTION

According to embodiments of the invention, phosphatic clay is incorporated in various forms to a soil profile of an otherwise adverse region to aid in water absorption and retention of the soil (particular sandy soils), and/or to prevent or reduce leaching of nutrients from seed or fertilizer, thereby improving plant health and increasing plant growth. Furthermore, by utilizing the phosphatic clay byproduct of phosphatic ore mining operations, the need for large clay settling areas is reduced. In the most preferred cases, the phosphatic clay byproduct from mining operations in a certain geographic area or region is utilized to improve the soil and/or growing conditions of the same area or region.

In embodiments, mined phosphate ore is "washed" as part of a beneficiation process. Following the washing step, a dilute clay slurry is rendered in which the solids are suspended in a liquid carrier such as water, initially containing from about two or three weight percent solids to about five or six weight percent solids. Optionally, this slurry can be pumped to large settling ponds for dewatering and consolidation, thereby rendering a higher concentrated slurry and/or dry clay product. As described above, these clays are not pure and can contain fine, unrecoverable particles of the mined phosphate mineral, such as apatite, and clay-sized particles of dolomite, calcite, silica, and the like, in addition to clay minerals. The clays can also contain small amounts of metals and radionuclides. Specifically, the composition of phosphatic clay can include, for example about 50-60% clay, 30-40% quartz, and 2-5% heavy minerals and miscellaneous components, such as the radionuclides.

Phosphatic clays have a fine grain size, comprising an average particulate size of about 4 µm (0.00015 in.) or less, compared to the grain size of silt which is from about 4 µm (0.00015 in.) to about 62 µm (0.0025 in.). More particularly, phosphatic clays are made up of clay particles having a particle size of less than two to four µm, with about half by weight of particles making up a finer fraction of less than 0.2 µm. The phosphate mineral, such as in the form of apatite, make up for these medium size fractions while the clay minerals, such as montmorillonite, make up these finer fractions. Due to unique mineralogy, rheology, particle size and shape, phosphatic clay exhibits high water absorbing and retaining qualities as compared to other clay varieties.

In one embodiment of the invention, a phosphatic clay product comprises a naturally occurring emulsion or clay suspension of phosphatic clay. The phosphatic clay product is then applied to a region, such as a sandy soil region. For example, the phosphatic clay product can be metered through a hose attachable spray pack. The phosphatic clay product is applied directly to soil area such that the phosphatic clay product will penetrate through the foliage, at low concentration, and enter the root zone of the plant. It then acts locally as a soil wetting agent at the root zone where it will remain and absorb and retain water so that water is consistently available to the plant, regardless of whether moisture is available in the surrounding environment.

In another embodiment of the invention, a phosphatic clay product comprises a "dry" (handleable) product comprising phosphatic clay grains or particles or granules. In this embodiment, a phosphatic clay slurry is dewatered such that it is available in dried or solid form, such that it can be used as a dry sprinkle, taking advantage of the very fine grain size of phosphatic clay. This clay is then easily dispersed over a soil region where it will remain and absorb and retain water so that water is consistently available to the root zones of plants, regardless of whether moisture is available in the surrounding environment.

In another embodiment, the dried phosphatic clay grains or particles are then granulated, optionally in the presence of a binder, to form granules having a size of from about 0.1 to about 5 mm, and more particular, from about 1.0 mm to about 2.0 mm. Suitable binders can include, but are not limited to, calcium lignosulfonate (such as Norlig A and Norlig G, commercially available from Borregaard Ligno-Tech), corn syrup, poly-vinyl alcohol (PVA) (such as Selvol™ Polyvinyl Alcohol 09-523 Solution available from Sekisui Specialty Chemicals America, LLC) and PVA-based adhesives or glues (such as Elmer's Glue-All® adhesive, commercially available form Elmer's), wheat starch, molasses, and combinations thereof. The binder can be present in an amount of about 0.1 wt % (dry weight of granule) to about 20 wt %.

The granules can be used over a soil region as described above, and can also be used for plantings. For example, the granules provide sufficient stability for planting of saplings, such that they can be used to fill a planting hole, with or without soil. This is particularly advantageous because of the delicate nature of saplings, and in areas of remote planting, in which a source of water may not be readily available, the granules can provide sufficient moisture retention to provide enough water for the saplings as the root system develops.

In yet another embodiment of the invention, a phosphatic clay product comprises a soil amendment, i.e. clay grains or particles admixed with soil. In this embodiment, phosphatic clay, available as a slurry or in dried form, is mixed with soil, such as a sandy soil. The mixed soil is applied to a region, topically or otherwise. The clay particles dispersed through the soil remain within the soil and therefore throughout the soil profile, to absorb and retain water throughout the soil profile so that water is consistently available to the root zones of plants.

In another embodiment of the invention, a phosphatic clay product comprises a base fertilizer granule coated with phosphatic clay. The base fertilizer granules can comprise, for example, phosphate fertilizers, potash or complete NPK formulations, and other specialty blends. In one particular example, the fertilizer granules comprise MicroEssentials® brand fertilizer available from the assignee of the present application. In another example, the fertilizer granules comprise K-Mag® brand fertilizer granules, available from the assignee of the present application.

A coating of phosphatic clay is distributed on an outer surface of each of the fertilizer granules. The coating can be formed, for example, by applying a slurry of phosphatic clay, such as an aqueous slurry, to at least a portion of the outer surface of the fertilizer granule. The slurry is dried, thereby leaving a coating of dried phosphatic clay grains. Particulates or grains also work into the voids of the granules, thereby providing a smoother outer surface. In one non-limiting embodiment, the clay coating can comprise about 0.1 to about 10.0 weight percent of the entire fertilizer granule on a dry basis, and more particularly from about 0.5 to about 2.0 weight percent. However, other coating weights can be contemplated including less than about 0.1 or 0.5 weight percent and more than 2.0 or 10.0 weight percent. This product allows for attraction and retention of water around the individual fertilizer granules, to alter the local soil environment, i.e. soil proximate the fertilizer granule to improve plant health, increase plant growth, and prevent or reducing leaching of nutrients away from the fertilizer granule.

The coating can also be applied for the purposes of controlling the release of nutrients from the base granule, to the soil, such that the fertilizer granule is a controlled- or slow-release fertilizer. In this respect, an optional coating, such as polymer coating (e.g. polyurethane) can be applied to the outer surface to further that assist or control the release of nutrients from the base fertilizer granule, to the soil. Because the outer surface is smoother than an uncoated granule due to the initial coating of phosphatic clay particulates, less polymer material is needed to evenly coat the granule.

Alternatively to fertilizer granules, seed granules can be coated with phosphatic clay to improve plant health because the clay absorbs and retains water around the individual seed, and similarly to prevent or reduce leaching of nutrients from the seed.

In yet another alternative embodiment of the invention, phosphatic clay is directly incorporated to the fertilizer composition, as opposed to or in addition to the phosphatic clay coating. The incorporated clay can comprise 0.1 to about 10.0 weight percent of the entire fertilizer granule on a dry basis, and more particularly from about 0.5 to about 2.0 weight percent. However, other coating weights can be contemplated including less than about 0.1 or 0.5 weight percent and more than 2.0 or 10.0 weight percent. Similar to the embodiment above, the fertilizers can comprise any of a variety of fertilizer types, including, but not limited to, varieties of NPK fertilizers including phosphate-based fertilizers, potassium-based or potash-based fertilizers, nitrogen-based fertilizers such as urea fertilizers, K-Mag®-brand fertilizers, MicroEssentials®-brand fertilizers, or the like. This allows for the prevention or reduction of leaching of nutrients from the fertilizer granule.

Compared to the commercially available synthetic soil wetting agent, the phosphatic clay products according to embodiments of the present invention have more uniform performance characteristics, are cheaper to produce, and will not break down as quickly. Further, due to the inherent fine grain size of phosphatic clay, which comprises an average particulate size of about 4 μm (0.00015 in.) or less (compared to the grain size of silt which is from about 4 μm (0.00015 in.) to about 62 μm (0.0025 in.), the phosphatic clay, when used in its dry form such as a dry sprinkle, granule, or as a soil amendment, will more easily infiltrate the soil.

Other advantages to using phosphatic clays is that by utilizing the already-produced byproduct of phosphate mining, there is the potential to alleviate or reduce the need for large clay settling areas, and to make better use of energy and water used in separating clay and sand and phosphate ore in the beneficiation process of phosphate ore mining.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. Soil wetting granules for altering moisture retention qualities of soil, the soil wetting granules comprising:
   a granulated agglomerate of phosphatic clay grains having an average clay grain particulate size of about 4 µm or less; and
   a binder.

2. The soil wetting granules of claim 1, wherein the phosphatic clay grains comprise clay and a material selected from the group consisting of mined phosphate mineral particulates, filler mineral grains, elemental metal particles, radionuclide particles, and combinations thereof.

3. The soil wetting granules of claim 1, wherein the binder is selected from the group consisting of calcium lignosulfonate, corn syrup, poly-vinyl alcohol (PVA), PVA-based adhesives or glues, wheat starch, molasses, and combinations thereof.

4. The soil wetting granules of claim 1, wherein the binder is present in an amount of about 0.1 wt % to about 20 wt %.

5. The soil wetting granules of claim 1, wherein the granules have a granule size of about 0.1 mm to about 5 mm.

6. The soil wetting granules of claim 5, wherein the granule size is from about 1.0 mm to about 2.0 mm.

7. A method of producing soil wetting granules, the method comprising:
   providing a phosphatic clay source including phosphatic clay grains having an average clay grain particulate size of about 4 µm or less;
   providing a binder material; and
   agglomerating the phosphatic clay grains by granulating the phosphatic clay source in the presence of the binder material, thereby forming the granules.

8. The method of claim 7, wherein the binder is selected from the group consisting of calcium lignosulfonate, corn syrup, poly-vinyl alcohol (PVA), PVA-based adhesives or glues, wheat starch, molasses, and combinations thereof.

9. The method of claim 7, wherein the binder is present in an amount of about 0.1 wt % to about 20 wt %.

10. The method of claim 7, wherein the granules have a granule size of about 0.1 mm to about 5 mm.

11. The method of claim 10, wherein the granule size is from about 1.0 mm to about 2.0 mm.

12. The method of claim 7, wherein the phosphatic clay grains comprise clay and a material selected from the group consisting of mined phosphate mineral particulates, filler mineral grains, elemental metal particles, radionuclide particles, and combinations thereof.

* * * * *

UNITED STATES PATENT AND TRADEMARK OFFICE
CERTIFICATE OF CORRECTION

| | | |
|---|---|---|
| PATENT NO. | : 9,512,046 B2 | Page 1 of 1 |
| APPLICATION NO. | : 14/473131 | |
| DATED | : December 6, 2016 | |
| INVENTOR(S) | : Beckingham et al. | |

It is certified that error appears in the above-identified patent and that said Letters Patent is hereby corrected as shown below:

On the Title Page

Item (57), Abstract, Line 9:
After "agents" delete "increases" and insert -- increase --.

In the Specification

Column 1, Line 40:
Delete "soils" and insert -- soil's --.

Column 2, Line 18:
After "application," insert -- and --.

Column 2, Line 55:
Delete "increases" and insert -- increase --.

Column 5, Line 27:
Delete "form" and insert -- from --.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*